US007016955B2

(12) United States Patent
Martin et al.

(10) Patent No.: US 7,016,955 B2
(45) Date of Patent: Mar. 21, 2006

(54) NETWORK MANAGEMENT APPARATUS AND METHOD FOR PROCESSING EVENTS ASSOCIATED WITH DEVICE REBOOT

(75) Inventors: Hamish Donald Stuart Martin, Edinburgh (GB); Christopher Robert Linzell, Hertfordshire (GB); Ronan François Daniel Grandin, Edinburgh (GB); Robert James Duncan, Edinburgh (GB)

(73) Assignee: 3Com Corporation, Marlborough, MA (US)

(*) Notice: Subject to any disclaimer, the term of this patent is extended or adjusted under 35 U.S.C. 154(b) by 959 days.

(21) Appl. No.: 09/897,381

(22) Filed: Jul. 2, 2001

(65) Prior Publication Data

US 2002/0120737 A1 Aug. 29, 2002

(30) Foreign Application Priority Data

Feb. 27, 2001 (FR) ............................................ 01 04870

(51) Int. Cl.
*G06F 15/173* (2006.01)

(52) U.S. Cl. ...................... 709/224; 709/220; 709/223; 709/238; 705/7; 340/506; 713/201

(58) Field of Classification Search ................ 709/220, 709/223, 224, 238; 705/7; 340/506; 713/201
See application file for complete search history.

(56) References Cited

U.S. PATENT DOCUMENTS

| 5,471,399 | A |   | 11/1995 | Tanaka et al. | ............... | 364/491 |
| 5,615,323 | A |   | 3/1997 | Engel et al. | ................. | 395/140 |
| 5,696,486 | A |   | 12/1997 | Poliquin et al. | ............ | 340/506 |
| 5,751,964 | A |   | 5/1998 | Ordanic et al. | ........ | 395/200.54 |
| 5,758,071 | A | * | 5/1998 | Burgess et al. | ............. | 709/220 |

(Continued)

FOREIGN PATENT DOCUMENTS

| EP | 0515296 A1 | 11/1992 |
| EP | 0849910 A2 | 6/1998 |
| EP | 1065894 A1 | 1/2001 |
| GB | 2271918 A | 4/1994 |
| GB | 2286317 A | 8/1995 |

(Continued)

OTHER PUBLICATIONS

Lenoir et al., "Real–Time Transmission Network Management and Operation Support System", Commutation & Transmission, vol. 12, No. 3, 1990, pp. 87–98.
S. Waldbusser, "Remote Network Monitoring Management Information Base", RFC 1271, Nov. 1991, pp. 1–81.
S. Waldbusser, "Remote Network Monitoring Management Information Base", RFC 2021, Jan. 1997, pp. 1–114.
Decker et al., "Definitions Of Managed Objects For Bridges", RFC: 1493, Jul. 1993, pp. 1–34.
McMaster et al., "Definitions Of Managed Objects For IEEE 802.3 Repeater Devices", RFC: 1516, Sep. 1993, pp. 1–40.
S. Waldbusser, "Remote Network Monitoring Management Information Base", RFC:1757, Feb. 1995, pp. 1–91.
McCloghrie et al., "Management Information Base For Network Management Of TCP/IP–Based Internets: MIB–II", RFC:1213, Mar. 1991, pp. 1–70.

(Continued)

*Primary Examiner*—Bharat Barot
*Assistant Examiner*—Liang-che Wang
(74) *Attorney, Agent, or Firm*—McDonnell Boehnen Hulbert & Berghoff LLP

(57) ABSTRACT

A network management apparatus and method reduces the number of events presented in an event list to a user. In particular, the apparatus and method reduces the number of events, which are generated during the monitoring of a network and may be due to rebooting of a device on the network, presented to the user by determining, upon receiving an event relating to a device, whether a more significant event already appears in the event list relating to the device, and if so, preventing the received event from being presented in the event list to the user.

27 Claims, 2 Drawing Sheets

U.S. PATENT DOCUMENTS

| | | | |
|---|---|---|---|
| 5,819,028 A | 10/1998 | Manghirmalani et al. | 395/185.1 |
| 5,828,830 A | 10/1998 | Rangaraian et al. | 395/185.01 |
| 5,923,247 A | 7/1999 | Dowden et al. | 340/506 |
| 5,951,649 A * | 9/1999 | Dobbins et al. | 709/238 |
| 6,040,834 A | 3/2000 | Jain et al. | 345/356 |
| 6,353,385 B1 * | 3/2002 | Molini et al. | 340/506 |
| 6,697,479 B1 * | 2/2004 | Barnes et al. | 379/215.01 |
| 6,763,379 B1 * | 7/2004 | Shuster | 709/224 |
| 6,810,427 B1 * | 10/2004 | Cain et al. | 709/238 |
| 6,832,086 B1 * | 12/2004 | Powers et al. | 455/423 |
| 6,862,619 B1 * | 3/2005 | Sugauchi et al. | 709/224 |
| 2002/0082886 A1 * | 6/2002 | Manganaris et al. | 705/7 |
| 2003/0041264 A1 * | 2/2003 | Black et al. | 713/201 |

FOREIGN PATENT DOCUMENTS

| | | |
|---|---|---|
| GB | 2333672 A | 7/1999 |
| GB | 2350035 A | 11/2000 |
| GB | 2362061 | 11/2001 |
| GB | 2362062 A | 11/2001 |
| WO | WO 94/19888 | 9/1994 |
| WO | WO 96/04755 | 2/1996 |
| WO | WO 97/31451 | 8/1997 |
| WO | WO98/19470 | 5/1998 |
| WO | WO 00/13373 | 3/2000 |
| WO | WO00/47003 | 8/2000 |
| WO | WO 00/72514 | 11/2000 |

OTHER PUBLICATIONS

IEEE Standard For Information Technology, "Part 2: Logical Link Control", 802.2, 1998, pp. i–239.

IEEE Standard For Information Technology, "Part 3: Carrier Sense Multiple Access With Collision Detection (CSMA/CD) Access Method And Physical Layer Specifications", 802.3, 2000, pp. i–1515.

* cited by examiner

NETWORK MANAGEMENT APPARATUS AND METHOD FOR PROCESSING EVENTS ASSOCIATED WITH DEVICE REBOOT

BACKGROUND OF THE INVENTION

Field of the Invention

The present invention relates generally to an apparatus and method for the management of a network, and more particularly to a network management apparatus and method capable of generating events when predefined significant conditions are detected.

CROSS REFERENCE TO RELATED APPLICATIONS

The following patent applications filed concurrently herewith are related to the present application and are incorporated herein by reference:

United States Patent application (Attorney Reference 3COM3584) entitled "Processing Network Events to Reduce the Number of Events to be Displayed";

United States Patent application (Attorney Reference MBHB01-494) entitled "Network Management Apparatus and Method for Determining Network Events", and United States Patent Application (Attorney Reference MBHB01-491) entitled "Apparatus and Method for Processing Data Relating to Events on a Network".

2. Description of the Related Art

The following description is concerned with a data communications network, and in particular a local area network (LAN). It will be appreciated, however, that the invention but has more widespread applicability to other managed communications systems including wide area networks (WANs) or wireless communications systems.

Networks typically comprise a plurality of computers, peripherals and other electronic devices capable of communicating with each other by sending and receiving data packets in accordance with a predefined network protocol. Each computer or other device on the network is connected by a port to the network media, which in the case of a LAN network may be coaxial cable, twisted pair cable or fibre optic cable. A network is generally configured with core devices having a plurality of ports, which can be used to interconnect a plurality of media links on the network. Such devices include hubs, routers and switches which pass data packets received at one port to one or more of its other ports, depending upon the type of device. Such core devices can be managed or unmanaged.

A managed device is capable of monitoring data packets passing through its ports and obtaining data relevant for network management. Managed devices additionally have the capability of communicating this data using a management protocol such as the SNMP (Simple Network Management Protocol), as described in more detail below. The skilled person will appreciate that the invention is not limited to use with SNMP, but can be applied to managed networks using other network management protocols.

SNMP defines agents, managers and MIBs (where MIB is Management Information Base), as well as various predefined messages and commands for communication of management data. An agent is present in each managed network device and stores management data and responds to requests from the manager. A manager is present within the network management station of a network and automatically interrogates the agents of managed devices on the network using various SNMP commands, to obtain information suitable for use by the network administrator, whose function is described below. A MIB is a managed "object" database which stores management data obtained by managed devices and is accessible to agents for network management applications.

It is becoming increasingly common for an individual, called the "network administrator", to be responsible for network management, and his or her computer system or workstation is typically designated the network management station. The network management station incorporates the manager, as defined in the SNMP protocol, i.e. the necessary hardware, and software applications to retrieve data from MIBs by sending standard SNMP requests to the agents of managed devices on the network.

A part of the network administrator's function is to identify and resolve problems occurring on the network, such as device or link malfunction or failure. Accordingly, network management software applications are employed to inform the network administrator of any significant conditions or "events", which have occurred on the network. Such events are entered in an event list, accessible to the network administrator, and are stored in an "event log" in memory or on a disk, as is well known in the art.

Many types of condition are detected by network management applications, which can potentially be entered in the event list. For example, the network management application may send an IP Ping to every device on the network at regular intervals and monitor the time taken for a response to be received. If no response is received this may be logged as an event. In another example, a network management application may receive an SNMP Trap from a managed network device. An SNMP Trap is automatically sent by an SNMP agent to the SNMP manager when certain conditions are detected by the agent in the managed device. Examples of conditions which cause SNMP Traps to be sent include "link up" and "link down". When an SNMP Trap is received by the network management station, the management application may log an event.

Yet another example is the regular polling by the management application of managed devices for MIB data containing information about the status of certain devices, ports or links. When certain predefined status conditions are detected, an event may be recorded. In another example, the network management application may log events when certain operations are performed, such as the reconfiguration of a network device. Other examples of network monitoring are possible and contemplated.

An example of a known network management software application capable of monitoring, and detecting the above described conditions on, a network is the 3Com® Network Supervisor available from 3Com Corporation of Santa Clara, Calif., USA. This application, and similar applications, uses SNMP commands to retrieve relevant management data from managed network devices, and processes the data accordingly.

A problem with known network management applications is that a large number of events can be recorded in the event log. In particular, when a problem occurs with a single device or link on a network, it may lead to multiple events being generated in relation to the device or link, or events being generated for other devices and links which, although not experiencing difficulty, are located downstream of the device or link with the problem relative to the management station. In addition, certain operations performed on a device on a network can cause a series of events to be generated during the operation. As a consequence of such large numbers of events appearing in the event list, the network administrator can have difficulty in distinguishing between events which indicate genuine problems on the network and those which represent less significant network activity or "side effects" of the genuine events.

Previously, techniques have been used to filter less significant events from the event log. For example, the network administrator may pass the event list through a filter which removes events originating from certain network devices or occurring at certain times of the day. A problem with such filters is that their use requires time and skill, since they are applied after events have been logged and must be operated by an experienced network administrator. In particular, the network administrator must select the correct filters in order to eliminate insignificant data whilst still maintaining all events which indicate genuine network problems.

It will be appreciated from the above that there is a need for an improved network management apparatus and method which addresses some of these problems, and reduces the number of less significant events entered in the event list.

In the aforementioned co-pending United States Patent Application entitled "Processing Network Events to Reduce the Number of Events to be Displayed" filed simultaneously herewith, there is described a method and apparatus in which events generated by a network management system are passed through one or more "event processors" to correlate events prior to presentation in an event list. Each processor is adapted to correlate certain types of events which may be generated as a result of certain conditions or problems on the network. This correlation ensures that the number of events presented in the event log is reduced, by avoiding presenting certain types of event which, generally speaking, are less informative about network conditions and problems to the user.

The present invention is concerned with a method which may be implemented by one such event processor, and an apparatus which may comprise such an event processor.

SUMMARY OF THE INVENTION

The present invention provides a network management apparatus and method for correlating events on a network indicative of, or associated with, the rebooting of a device.

In accordance with a first aspect, the present invention provides a method for reducing a number of events presented in an event list to a user by a network management system, which events are generated by the network management system during the monitoring of a network and may be due to rebooting of a device on the network, the method comprising: receiving an event relating to a device; determining whether a more significant event already appears in the event list relating to the device, and, if so, preventing the received event from being presented in the event list to the user.

As described below, the rebooting of a device can cause a series of events to be entered in the event list in conventional network management systems. By correlating events which may be due to device reboot, the present invention can eliminate, or prevent the presentation and or storing, some of the less significant of these events.

In a preferred embodiment, when the method receives a series of events indicative of a device reboot, the method logs a single event.

In accordance with a second aspect, the present invention provides a computer readable medium having a computer program for carrying out the method in accordance with the first aspect of the present invention.

In accordance with a third aspect, the present invention provides a network management system for monitoring a network and generating events, the system for reducing a number of generated events presented in an event list to a user, which events may be due to rebooting of a device on the network, the system comprising a processor for determining if a received event is more significant than an event already appearing in the event list, and if so, the processor preventing the event from appearing in the event list.

Other preferred and optional features and advantages of the present invention will be apparent from the following description and accompanying claims.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENTS

Figure 1:
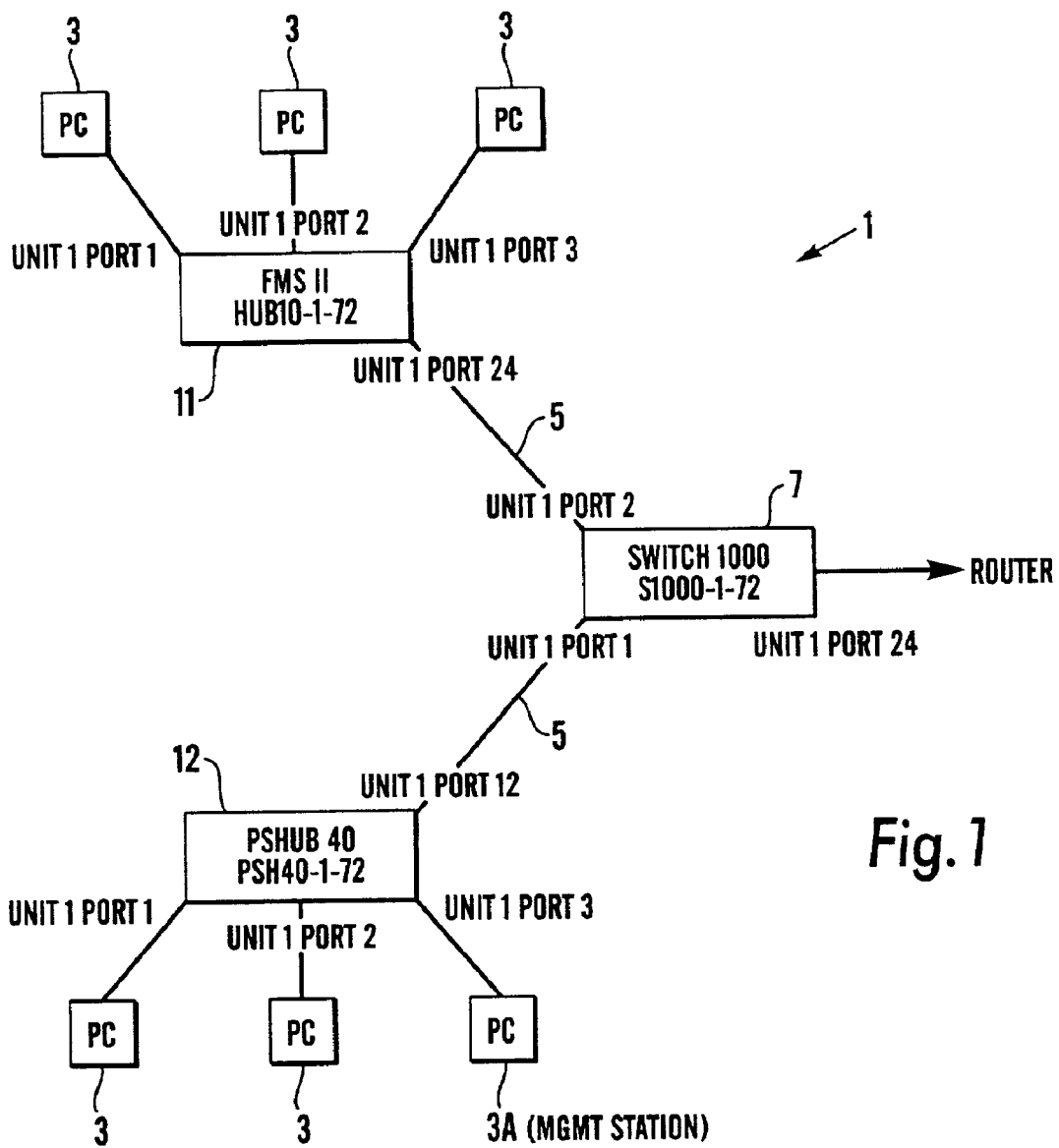
FIG. 1 is a block diagram of a typical managed network including a network management station which may be employed in accordance with the present invention.

FIG. 1 shows a typical network 1 incorporating a network management system in accordance with the present invention. The network 1 includes a network management station 3A which incorporates the necessary hardware and software for network management. In particular, the network management station 3A includes a processor, a memory and a disk drive as well as user interfaces such as a keyboard and mouse, and a visual display unit. Network management application software in accordance with the present invention is loaded into the memory of management station 3A for processing data as described in detail below. The network management station 3A is connected by network media links 5 to a plurality of managed network devices including core devices such as network switch 7, hubs 11 and 12, and a router (not shown) which may be managed or unmanaged, and end stations including personal computers (PCs) 3 and workstations. The network may also include unmanaged devices, for example peripheral devices such as printers.

The network management station 3A is capable of communicating with the managed network devices such as network switch 7 and hubs 11 and 12 by means of a network management protocol, in the present embodiment the SNMP protocol, in order to obtain network management data. In particular, the management station 3A includes the SNMP manager. Each managed device monitors operational characteristics of the network and includes an SNMP agent which stores MIB data in memory on the device, as is well known in the art, and communicates such data to the SNMP manager in the network management station 3A, as described below.

The network management station 3A includes a network management software application which sends SNMP requests to the managed network devices at regular intervals and processes the received MIB data. In addition, the management application may periodically send signals to devices on the network which prompts a response from the device (e.g. by ICMP echo or IP Ping, as is known in the art). The network management application will typically monitor the time taken to receive a response from each device. Finally, the network management application may receive and process SNMP Trap signals from managed network devices.

When processing of data by the network management application detects certain predetermined conditions, the network management application will generate an event. For example, if a network device fails to respond to an IP Ping sent by the network management application within a predetermined time period, an event will be generated. Such events are stored in memory and placed in an event list for presentation e.g. by display on a display screen or in printed form. For each event, the information recorded includes the time of the event, the nature of the event, and the identity of the device concerned.

Events arising from certain detected conditions are considered to be less significant to the network administrator. For example, if an end station (PC) fails to respond to an IP Ping, the most likely reason is that the PC has been switched off, which is not in itself a problem. Other circumstances may cause the generation of a series of events which similarly do not represent problems on the network, but result from one significant network condition or problem.

The following types of conditions associated with device reboot can lead to the generation of such events:

During a configuration operation on a network device, an event may be generated and logged when a network management software application commences the configuration operation on a device; the configuration may cause the device to reboot which may cause the generation of further events (see below), and an event will be generated and logged when the application completes the configuration operation.

If a managed network device sends to the management station an SNMP trap which indicates that it has rebooted, the network management application will generate and log an event. This will occur whenever a managed device is rebooted, whether or not it is as a result of a configuration operation as mentioned above.

If a managed network device sends to the network management station an SNMP trap indicating that a port on the device has gone up or down (SNMP linkUp or linkDown Traps), an event will be generated.

In addition, if a link or port on a network device has gone down, this may be detected by the network management application processing MIB data obtained from the agent of a managed network device through monitoring the state of the port using SNMP. This will similarly cause an event to be generated and logged.

If an SNMP trap is sent by a managed network device to the management application indicating that the Spanning Tree Topology has changed, the network management application may generate and log an event.

Finally, and as indicated above, if a device stops responding to IP Ping signals because, for instance, it is turned off or a link between it and the management station has gone down, an event will be generated and logged. Conversely, an event will be generated and logged when a device starts responding to IP Ping signals (after previously stopping responding).

The skilled person will appreciate that the present invention may be used to eliminate some or all the above types of event log entries, since not all applications will log all the above types of event. However, the present invention is useful if the network management application detects any of the conditions above, even if it does not log it as an event. For example if the application merely detects that a device has started responding to IP Pings, but doesn't normally log this information, the detection of this condition itself can be considered to be an event for the purposes of implementing the invention.

In accordance with the present invention the network management application can perform actions on events, preferably after their generation but before they are stored in the event log and presented in the event list in order to keep the number of entries stored and displayed to the user in the event list small without losing any useful information.

Generally speaking, the preferred embodiment of the present invention is concerned with reducing the number of events placed in the event list for display to the user when a device reboots. In particular, when a device reboots certain types of events might appear in the event log as a "side effect" of the reboot.

Figure 2:
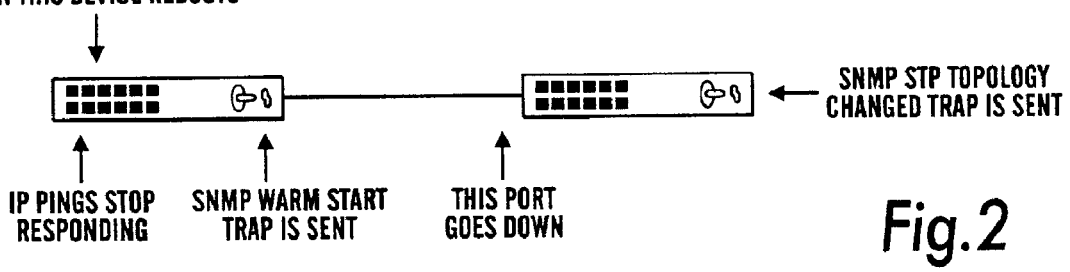
FIG. 2 is a schematic diagram showing the events generated by a known network management application when a device reboots.

FIG. 2 illustrates a series of events which may be generated in a typical network management application when switch 7 reboots. The skilled person will appreciate that the events may be generated in a different order and/or different events may be generated when switch 7 reboots. Firstly, switch 7 stops responding to the periodic IP Ping signals sent to it by the network management application, leading to a first event. The switch 7 sends an SNMP warm start Trap to the network management station 3A which causes a second event to be logged. The link between switch 7 and hub 12 goes down, and consequently the SNMP MIB data in hub 12 indicates that port 12 of hub 12 has gone down and/or hub 12 may send a SNMP Link down Trap to management station 3A, leading to the logging of one or more further events.

In accordance with the preferred embodiment, instead of logging a series of events which arise from an underlying or causal condition or problem (such as device reboot), a single event is logged which best indicates to the administrator the underlying event, (in the example the single event indicates that the device has rebooted). This avoids displaying events which are essentially side effects of, or caused by, the device reboot. Since the order in which the events occur is variable, the preferred embodiment performs this task irrespective of the order in which the events are generated.

Likewise, when a device is being reconfigured many kinds of events might appear in the event log as a side effect of the reconfiguring operation, including an event indicating that the device has rebooted. In accordance with the preferred embodiment of the present invention, a single event is logged, for inclusion in the event list, indicating that the device has been reconfigured. The event indicating that the device has rebooted is not logged for presentation to the user, since this event is considered to be a side effect of the reconfiguration operation.

Thus, the present invention typically presents only the most significant or informative event to the user.

Figure 3:
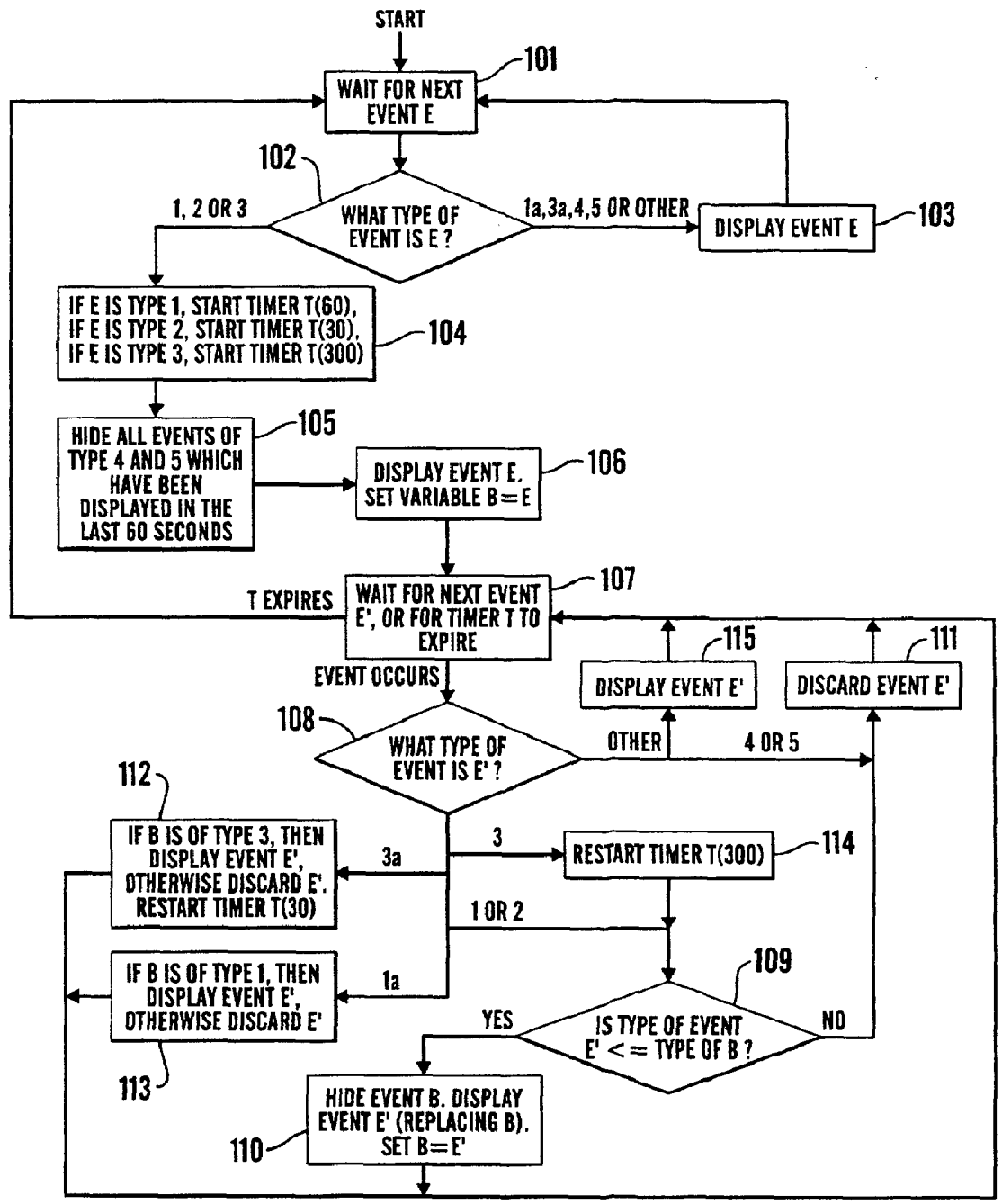
FIG. 3 is a flow diagram of the method steps performed by a computer program in accordance with a preferred embodiment of the present invention.

The method steps performed in a preferred embodiment of the present invention are illustrated in the flow chart of FIG. 3. In accordance with the preferred embodiment, the method is performed by a computer program which forms part of a network management software application. It will be appreciated that the method may be implemented in other forms, for example, in hardware.

The network management software application generates events as described above. In accordance with the preferred embodiment, certain types of event are recognised and utilised in the present invention. These types of event are considered to be related to device reboot. Each type of event is assigned a level of priority which depends upon how meaningfully it describes the underlying problem or condition to the user. These types of event include, in order of priority:

1. Events caused by the network management application receiving a message from a bulk configuration software application which indicates that it has started to configure a network device D. This type of event is referred to herein as "Configuration Start event".

1A. Events caused by the network management application receiving a message from a bulk configuration software application which indicates that it has finished configuring a network device D. This type of event is referred to herein as "Configuration Finish event".

2. Events caused by the network management application receiving an SNMP warm or cold start Trap from a managed network device D. This type of event is referred to herein as "Warm/Cold Start Trap event".

3. Events caused by a device D failing to respond to an IP Ping signal from the network management application. This type of event is referred to herein as "IP Ping Stop event".

3A. Events caused by a device D starting to respond to an IP Ping signal from the network management application, having previously stopped responding. This type of event is referred to herein as "IP Ping Start event".

4. Events caused by a link connected to device D going down, due to the network management application either receiving MIB data indicating this state or receiving an SNMP "Link down" Trap from a managed device connected to device D by the link. This type of event is referred to herein as "Link Down event".

5. Events caused by a link connected to device D going up, after it has been down, due to the network management application either receiving an SNMP "Link up" Trap from a managed device connected to device D by the link or receiving an "STP Topology change" Trap from another managed network device on the network. This type of event is referred to herein as "Link Up/STP event".

The skilled person will appreciate that other events similar in type to the above listed types of events relating to device reboot are possible. Any event other than the above-listed types 1 to 5, or their equivalent, is considered to be unrelated to the reboot of device D. Such events have no priority and are referred to herein as "unrelated events".

The priority number applied to the abovementioned types of events indicates the different level of importance of the event to the user. Thus, priority number 1 represents the highest level of importance and events of type 1 are described below as priority "level 1" events, and priority number 5 represents the lowest level of importance and events of type 5 are described below as priority "level 5" events.

As will be appreciated from the discussion above, events of type 1, 2 or 3 may represent the underlying cause of a series of events. In particular, a type 1, Configuration Start event, indicates that a configuration application is being initiated which will lead to the generation of events. A type 2, Warm/Cold Start Trap event, indicates that a device is being rebooted which may cause the generation of other events. A type 3, IP Ping Stop event, indicates that a device has gone down, which, if the device is a core network device, may lead to the generation of other events.

Events of type 1, 2 and 3 (i.e. Configuration Start Events; Warm/Cold Start Trap events, and IP Ping Stop events) are referred to herein as "Potential Causal events" because, although they may represent an underlying cause, events of type 3, may result from events of higher priority level type 1 or 2, and events of type 2 may result from events of type 1, thus events of type 2 and 3 are only potentially causal.

Events of type 1A, Configuration Finish events, and type 3A, IP Ping Start events, may represent the conclusion of an underlying cause or the correction of an underlying problem on a network. These types of event are referred to as "Concluding events".

Conversely, events of type 4 and 5, Link Up/STP and Link Down Trap events, are most likely to represent events which result from events of a higher priority level, i.e. types 2 and 3. These events are referred to herein as "Side Effect events".

The program receives all events relating to a particular device D as they are generated by a network management application. The events relating to device D may include not only events caused by device D directly, but also events relating to links connected to device D. The network management application can determine the events which are passed to the program since the topology of the network is known.

It will be appreciated that a separate program or "state machine" is provided for each network device being monitored by the network management application.

Before describing the program illustrated in FIG. 3, it is useful to set out its aims and objectives in relation to the handling of events associated with device reboot (types 1 to 5 listed above).

In particular, in accordance with the present invention, the aim is to present to the user at any one time the most likely causal event (i.e. the event which most likely represents the underlying problem or condition which has caused a series of events to be generated). This will be the most significant (i.e. highest priority) event that has been received at that moment in time. Generally it will be a Potential causal event (types 1, 2 or 3) but it may be a Side Effect event (type 4 or 5) if only these types of event have been received at that time.

The program needs to ensure that it handles all events associated with one underlying problem or condition. In the embodiment described below, this is achieved through the use of timers. The program starts a timer running for a time period when a first Potential Causal event is received, and continues to process further events, which are received whilst the timer is running, as if they were related. The timer may be reset or adjusted depending upon the further events received.

In addition, a further aim is to hide from the user all less significant (i.e. lower priority) events which are related to the underlying problem or condition, i.e. device reboot.

In a preferred implementation, the network management software application sends IP Ping to the network devices at periodic intervals of 30 seconds and waits up to 30 seconds for a response (if no response is received an IP Ping stop event may be generated); in any case, there will be a delay between the IP Ping being sent and a response being received depending upon the characteristics of the particular network. In view of this, Side Effect events of type 4 or 5 may occur before the generation of an event indicating the start of a device reboot (e.g. IP Stop event for the device), and after an event indicating the completion of device reboot (e.g. IP Start event for the device). The program needs to hide such Side Effect events from the user.

Thus, in the embodiment described below, the program hides Side Effect events generated in the 60 seconds preceding the generation of the first Potential Causal event, since 60 seconds represents the maximum time between a device going down and an event being generated (the IP Ping may be sent no more than 30 seconds after the device goes down, and an event is not generated for a further 30 seconds). In addition, in the embodiment described below, the program hides Side effect events generated up to 30 seconds after the generation of the Concluding event, since 30 seconds has been found to be the time for Side Effect events to stop occurring in a typical network. (Generally, Side Effect events may continue to occur after a Concluding event as the device completes initiating procedures—e.g. an STP event will not occur until STP negotiation is complete).

Typically a reboot process may take up to 300 seconds (5 minutes), so the timer may run for up to 330 seconds (300 seconds plus 30 seconds to remove residual side effect events as described above), during which received events are processed as if they were related.

The program illustrated in FIG. 3 will now be described. As the skilled person will appreciate, the program is illustrative of one way of implementing the invention, and many alternatives to the described steps and parameters (such as time intervals) are possible according to the network and management system with which it is utilised.

The program starts at step 101 by waiting for a next event, "event E", to be generated. When event E is received, step 102 considers the event type of event E. If event E is a Potential Causal event, i.e. of type 1, 2 or 3, as defined above, the program continues with step 104, described below. If event E is a Concluding event (i.e. of type 1A, 3A), a Side Effect event (i.e. type 4 or 5) or an unrelated event (marked "other" in FIG. 3), the program continues with step 103 by logging the event E in the event log. The logging of an event causes the event to be stored in memory and placed in the event list for display on the display screen of the network management station at the request of the network administrator. The program then returns to step 101.

It will be appreciated that if the present invention is implemented in one of a series of "event processors", as described in the aforementioned patent application entitled "Processing Network Events to Reduce the Number of Events to be Displayed", then step 103, and similar steps described below in which an event is logged for display, may pass the event to another event processor and not directly to the memory associated with the event log.

At step 104, the program starts a timer T. Preferably, the timer is set to run for a period in accordance with the priority level and/or nature of the event E. In the embodiment illustrated in FIG. 3, if the event E is a level 1 event, i.e. a Configuration Start event, the timer T is set to run for 60 seconds ("T (60)"). If the event E is a level 2 event, i.e. a Warm/Cold Start Trap event, the timer T is set to run for 30 seconds ("T(30)"). If the event E is a level 3 event, i.e. an IP Ping Stop event, the timer T is set to run for 300 seconds ("T (300)"). Again, these time periods may be varied according to the circumstances.

However, in the preferred embodiment the abovementioned time periods are chosen for the reasons outlined above.

In particular, 30 seconds is employed for a Warm/Cold Start Trap event indicating a device reboot, since this represents the maximum length of time for a "side effect" event to occur in a typical network after a device has rebooted.

60 seconds is chosen for Configuration Start events since, if the device subsequently reboots it will go down, and 60 seconds represents the maximum amount of time it can take from the time a device goes down before an IP Ping event is generated in the described implementation, as discussed above, 300 seconds is employed for an IP Ping Stop event, which indicates that a device is not responding but may be about to be rebooted, since this represents the maximum length of time for a typical network device to reboot, as discussed above.

At step 105 the program continues by searching the event log (or internal state information on events in the event log) for Side Effect events (i.e. type 4 and 5—Link up/STP and Link down events), which relate to device D, and hides from the event list any events found which have been entered with a time in an immediately preceding time interval. This time interval is 60 seconds in the preferred embodiment. The skilled person will appreciate that the time interval may vary depending upon the underlying cause and nature of the events which the program is aimed at eliminating. In the preferred embodiment, 60 seconds is chosen since this represents the typical maximum time between a device going down and the application reporting that the device is not responding to IP Ping. It will be appreciated that if the application would typically take a longer period of time to discover that a device is down, then an appropriate time interval longer than 60 seconds should be used.

Thus, Side Effect events previously received and logged in step 103 are hidden in step 105.

For the purpose of the present description, an event is "hidden" by removing it from the event list presented to the user. However, the event may remain logged in the sense that it is stored in memory associated with the event log. It will be appreciated that in some embodiments, the event may be deleted from memory.

At step 106, with the timer running, the program stores the event E in memory and places it in the event list to display event E. In addition, step 106 sets a variable B as E. More specifically, the program stores in memory, a variable B which corresponds to the priority level or numerical value applied to the type of event E (i.e. B=1 for event type 1, B=2 for event type 2 or B=3 for event type 3).

This represents the end of the first part of the program which handles a first event E.

At step 107, while the timer is continuing to run, the program waits for further events E'. When a further event is received whilst the timer continues to run, the program continues with step 108.

At step 108, the program considers the type of event received at step 107.

If the event is Side Effects event (i.e. type 4 and 5—Link up/STP or Link down event), the program discards the event E' at step 111. (It will be appreciated that, in other embodiments, event E' could be hidden and not discarded).

If the event is a Configuration Start event or a Warm/Cold Start Trap event (i.e. a level 1 or level 2 event), the program continues with step 109. If the event is a Configuration Finish event (i.e. level 1A event), the program continues with step 113. If the event is an IP Ping Start event (i.e. a level 3A event), the program continues with step 112. If the event is an IP Ping Stop event (i.e. a level 3 event), the program continues with step 114. If the event is an unrelated event (i.e. other event), the program continues with step 115.

The second part of the program, comprising steps 108 and 115, is concerned with avoiding presenting events of types 2 and 3 which are not the underlying causal event, or removing an event of type 2 and 3 and replacing it with an event received which is the more likely causal event i.e. which has a higher priority level.

This ensures that only the most relevant event, i.e. the highest priority event, is presented to the user in the event list. In addition, the program ensures that when the most relevant event is resolved or concluded, an event is additionally entered to show this to the user.

Thus, in the case that event E' is a Concluding event, which resolves the condition or problem represented by the most relevant event in the list and stored as variable B, event E' should be added to the event list.

Thus, if event E' is a type 1A Configuration Finish event, at step 113 the program considers if variable B=1 and if so displays the event E'. Otherwise, i.e. if B≠1, it discards the event E'. The program then returns to step 107 whilst the timer continues to run.

Similarly, if event E' is a type 3A Device Start IP event, at step 112 the program considers if variable B=3 and if so displays event E'. Otherwise, i.e. if B≠3, it discards event E'. In addition, step 112 restarts the timer T to run for a further time interval, in the preferred embodiment 30 seconds ("T(30)"). The timer is reset for a shorter time period than step 105 sets the timer for a type 3 event because a type 3A event, indicating that a device is responding again, is indicative of the resolution of a problem and that further events, such as Side Effect events, are unlikely to follow for more than another 30 seconds (as explained above). This avoids the timer continuing to run for the full 300 seconds from step 105. In addition, it ensures that all related Side Effect events are discarded after completion of the reboot, as explained above. It will be appreciated that, in other embodiments, the step of resetting the timer may be omitted or set for shorter or longer time periods. Following the timer reset at step 112, the program continues with step 107, described above, while the timer continues to run.

Steps 109, 110 and 111 are employed if event E' is a Potential Causal event, and are concerned with determining if event E' is more significant than the currently most significant event in the event list, which has a priority level corresponding to variable B, and that the most significant event is displayed in the event list.

If event E' is a level 1 or 2 event, the program proceeds straight to step 109. If event E' is a level 3 event, the program proceeds with step 114 by resetting the timer for 300 seconds ("T(300)") before proceeding to step 109. The timer is reset because a level 3 event will occur only after a level 3A event, so that if multiple level 3 and 3A events occur in quick succession after a type 1 or 2 event, any Side Effect events resulting therefrom will be hidden/discarded by step 111 whilst the reset timer continues to run.

Step 109 compares the priority level of event E' with the variable B. If B is greater than the priority level of E', then event E' is more significant and step 110 replaces the event corresponding to B with event E' in the event list and resets the variable B as the priority level of E' since this value now represents the most significant event. Otherwise, if B is less than or equal to the level of E', the existing event is more significant than the new event E' and step 111 discards event E'. In either case, the program returns to step 107 whilst timer T continues to run.

As indicated above, the method of the present invention is performed by a computer program in a network management station in accordance with the present invention. The network management station 3A comprises a processor, a disk drive, memory, and user interfaces including a display screen, keyboard, mouse, and a printer. The computer program described above is typically provided on a computer readable medium, such as a disk, and is loaded onto the network management station using the disk drive and the processor runs the program. Alternatively, the computer program may be carried on a computer system having the website of, for example, the supplier of network devices, which permits downloading of the program over the Internet on a carrier wave to the network management station 3A.

As the skilled person will appreciate, various modifications may be made to the described embodiment.

In particular, events associated with other network conditions which cause a flood of related, but less significant/lower priority, events as a "side effect" thereof may be handled in accordance with the present invention.

Furthermore, whilst the described program is performed in real time, i.e. in response to the generation of events, it may be used to process event data at a later time.

In addition, whilst the described program uses timers, the skilled person will appreciate that there are other well known alternative methods for achieving the same effect as a timer. For example, the timing could be done equally well by comparing "time stamps" of events, which for part of the event data. Thus, instead of starting a timer, when a new event is received by the program, the time stamp of that event may be considered to be the "current time". When the program requires that a timer T(n) be started, the "expiry time" of the timer is computed as "current time" + n seconds. As soon as an event to be processed is received having a time stamp later than "expiry time", then the timer is considered to have expired and the program returns to step 101.

The program of the described embodiment assumes that the events received occur in chronological order, however, using the alternative just described, it would be possible to use the program to process a batch of events which occurred at different times. Such a scheme could be used to analyse a log of events sometime after the events were originally created.

In the described embodiment the program sometimes hides IP Start and IP Stop events and instead presents a "device reboot" event. When this occurs, the application could also present information beside the device reboot event stating how long the device took to reboot, by comparing the time difference between when the IP Stop and IP Start events.

In the described embodiment the program presents Side Effect events in step 103 and then may hide them later in step 105. In an alternative the implementation it would be possible to delay the presentation of such events that might potentially be hidden, until such time as it is certain that the event will not be hidden.

It is intended to include all such variations, modifications and equivalents which fall within the spirit and scope of the present invention as defined in the accompanying claims.

What is claimed is:

1. A method for reducing a number of events presented in an event list to a user by a network management system, which events are generated by the network management system during the monitoring of a network and including events generated due to rebooting of a device on the network, wherein the events include most significant events comprising potential causal events and events of lesser significance including side effect events the method comprising:

receiving an event relating to a device;

determining whether a more significant event already appears in the event list relating to the device, and if so, preventing the received event from being presented in the event list to the user, and if a potential causal event is received, preventing received side effect events from being presented in the event list for a time interval, wherein the time interval includes a time period prior to a time of the potential causal event.

2. A method as claimed in claim 1, wherein the events are assigned a priority value according to the type of event, the priority value indicative of the relative significance of the event, and the step of determining comprises comparing the priority value of the received event with the priority value of existing events in the event list to determine whether a more significant event already appears in the event list.

3. A method as claimed in claim 2, wherein the priority value of the most significant event in the event list is stored in memory, and the step of comparing comprises comparing the priority value of the received event with the priority value in memory.

4. A method as claimed in claim 1, wherein:
the potential causal events include events which are generated as a result of receiving a Warm/Cold Start Up Trap from the device or failure of the device to respond to IP Ping, and
the side effect events are events which are generated as a result of receiving a Link Up Trap or a Link Down Trap for a link connected to the device.

5. A method as claimed in claim 4, wherein potential causal events which are generated as a result of receiving a Warm/Cold Start Up Trap are more significant, and are assigned a lower priority value, than potential causal events generated as a result of failure of the device to respond to IP Ping.

6. A method as claimed in claim 4, wherein the potential causal events further include events generated as a result of a configuration message indicating that configuration of the device has started.

7. A method as claimed in claim 6, wherein potential causal events generated as a result of a configuration message indicating that configuration of the device has started are more significant, and are assigned a lower priority value, than potential causal events which are generated as a result of receiving a Warm/Cold Start Up Trap.

8. A method as claimed in claim 1, further comprising, after the step of receiving the event, considering whether the event is a potential causal event, and if so, starting a timer running for a time period, and presenting the event in the event list.

9. A method as claimed in claim 8, further comprising, preventing any further side effect events received whilst the timer is running from being presented in the event list.

10. A method as claimed in claim 8, wherein, after the step of presenting, if a new potential causal event is received whilst the timer is running which is more significant than the event presented in the presenting step, the method further comprises the step of replacing the presented event with the new event.

11. A method as claimed in claim 8, wherein, after the step of presenting, if a new potential causal event is received whilst the timer is running which is less significant than the event presented in the presenting step, the method further comprises the step of preventing the new event from appearing in the event list.

12. A method as claimed in claim 8, wherein, after the step of presenting, if a new potential causal event is received whilst the timer is running which has the same significance as the event presented in the presenting step, the method further comprises the step of presenting the new event in the event list.

13. A method as claimed in claim 8, wherein the events further include concluding events which represent the conclusion or resolution of a device condition indicated in the previously received potential causal event, the method further comprising:
after the step of presenting, if a new event is received whilst the timer is running which is a concluding event, considering whether the new event is an event that concludes a presented potential causal event, and if so, presenting the new event in the event list.

14. A method as claimed in claim 13, wherein the concluding events include:
events generated as a result of a configuration message indicating that configuration of the device has finished which conclude events generated as a result of a configuration message indicating that configuration of the device has started, and
events generated in response to the device starting to respond again to IP Ping which conclude events generated through failure of the device to respond to IP Ping.

15. A method as claimed in claim 8, wherein, when the timer expires, the method restarts and presents the first received event in the event list.

16. A method as claimed in claim 15, wherein, prior to presenting the first received event, the method comprises considering the type of event, and, if the event is a potential causal event, starting a timer prior to presenting the event in the event list.

17. A method for reducing a number of events presented in an event list to a user by a network management system, which events are generated by the network management system during the monitoring of a network and include events generated due to rebooting of a device on the network, wherein the events include most significant events comprising potential causal events and events of lesser significance including side effect events the method comprising:
receiving an event relating to a device,
determining whether the most significant event relating to the device that already appears in the event list is less significant that the received event, and if so, replacing the less significant event with the received event in the event list for presentation to the user, and
if a potential causal event is received, preventing received side effect events from being presented in the event list for a time interval,
wherein the time interval includes a time period prior to a time of the potential causal event.

18. A method as claimed in claim 17, wherein the events are assigned a priority value according to the type of event, the priority value indicative of the relative significance of the event, and the step of determining comprises comparing the priority value of the received event with the priority value of existing events in the event list to determine whether a more significant event already appears in the event list.

19. A method as claimed in claim 18, wherein the step of comparing comprises comparing the priority value of the received event with the priority values of existing events in the event list which were generated in an immediately preceding time period.

20. A method as claimed in claim 18, wherein the priority value of the most significant event in the event list is stored in memory, and the step of comparing comprises comparing the priority value of the received event with the priority value in memory.

21. A method for reducing a number of events presented in an event list to a user by a network management system, which events are generated by the network management system during the monitoring of a network and including events generated due to rebooting of a device on the network, wherein the events include most significant events comprising potential causal events and events of lesser significance including side effect events, the method comprising:

receiving an event relating to a device, determining whether the most significant event relating to the device that already appears in the event list is less significant that the received event, and if so, removing from the event list all events relating to the device that already appear in the event list, and adding the received event to the event list for presentation to the user, and if a potential causal event is received, preventing received side effect events from being presented in the event list for a time interval, wherein the time interval includes a time period prior to a time of the potential causal event.

22. A method as claimed in claim 21, wherein the step of determining considers event relating to the device generated in a preceding predetermined time period, and the step of removing removes all events relating to the device generated in the preceding predetermined time period.

23. A computer readable medium including a computer program for carrying out the method as defined in claim 1.

24. A computer readable medium including a computer program for reducing a number of events presented in an event list to a user by a network management system, which events are generated by the network management system during the monitoring of a network and including events generated due to rebooting of a device on the network, wherein the events include most significant events comprising potential causal events and events of lesser significance including side effect events, the program comprising:

a program step for receiving an event relating to a device, a program step for determining whether a more significant event already appears in the event list relating to the device, and a program step for preventing the received event from being presented in the event list to the user if the program step for determining determines that a more significant event already appears in the event list, and a program step for preventing received side effect events from being presented in the event list for a time interval if a potential causal event is received.

wherein the time interval includes a time period prior to a time of the potential causal event.

25. A network management system for monitoring a network and generating events, the system for reducing a number of generated events presented in an event list to a user, which events include events generated due to rebooting of a device on the network, wherein the events include most significant events comprising potential causal events and events of lesser significance including side effect events, the system comprising:

a processor for determining if a received event is more significant than an event already appearing in the event list, and if so, the processor preventing the event from appearing in the event list, and if a potential causal event is received, preventing received side effect events from being presented in the event list for a time interval wherein the time interval includes a time period prior to a time of the potential causal event.

26. A network management system as claimed in claim 25, wherein the events are assigned a priority value according to the type of event, the priority value indicative of the relative significance of the event, and wherein the processor compares the priority value of the received event with the priority value of existing events in the event list to determine whether a more significant event already appears in the event list.

27. A network management system as claimed in claim 26, further comprising memory for storing the priority value of the most significant event in the event list, wherein the processor compares the priority value of the received event with the priority value in memory to determine whether a more significant event already appears in the event list.

* * * * *